(12) United States Patent
Provencher et al.

(10) Patent No.: US 12,703,222 B2
(45) Date of Patent: Aug. 11, 2026

(54) SWAY BAR BUSHING BRACKET WITH TOW HOOK

(71) Applicant: Advanced Flow Engineering, Inc., Corona, CA (US)

(72) Inventors: James Erik Provencher, Norco, CA (US); Saul Zambrano, Corona, CA (US); Shahriar Nick Niakan, Anaheim Hills, CA (US); Stuart Miyagishima, Corona, CA (US); John Gray, Corona, CA (US)

(73) Assignee: Advanced Flow Engineering, Inc., Corona, CA (US)

( * ) Notice: Subject to any disclaimer, the term of this patent is extended or adjusted under 35 U.S.C. 154(b) by 0 days.

(21) Appl. No.: 18/677,748

(22) Filed: May 29, 2024

(65) Prior Publication Data

US 2024/0308293 A1 Sep. 19, 2024

Related U.S. Application Data

(63) Continuation of application No. 18/050,960, filed on Oct. 28, 2022, now Pat. No. 12,023,979.

(51) Int. Cl.
*F16M 11/00* (2006.01)
*B60D 1/48* (2006.01)
*B60G 21/055* (2006.01)

(52) U.S. Cl.
CPC ........... *B60G 21/0551* (2013.01); *B60D 1/48* (2013.01); *B60G 2204/1222* (2013.01); *B60G 2204/43* (2013.01); *B60G 2206/722* (2013.01)

(58) Field of Classification Search
CPC ........ B60G 21/0551; B60G 2204/1222; B60G 2204/43; B60G 2206/722; B60G 2206/911; B60D 1/48; B60D 1/565
See application file for complete search history.

(56) References Cited

U.S. PATENT DOCUMENTS

| | | | | |
|---|---|---|---|---|
| 10,457,104 | B2 * | 10/2019 | Shenaq | B60D 1/565 |
| 11,376,903 | B2 * | 7/2022 | Frisch | B60D 1/56 |
| 11,807,056 | B2 * | 11/2023 | Barrios Albert | B60D 1/565 |

* cited by examiner

*Primary Examiner* — Amy J. Sterling
(74) *Attorney, Agent, or Firm* — Rutan & Tucker LLP; Ravi Mohan; Hani Z. Sayed

(57) ABSTRACT

Currently, some work vehicles and/or off-road vehicles come from the manufacturer lacking tow hooks—or even a strong point on the rear bumper assembly and/or the chassis to install a tow hook. A non-limiting example of this sort of vehicle is the Toyota Tundra. It is highly desirable for such a vehicle to be able to be towed by another vehicle and/or have connection points for recovery from stuck in a natural hazard like mud or water. A novel and improved sway bar bushing bracket with a tow hook design is disclosed. In particular, the manufacturer-installed sway bar bushing bracket may be replaced with a reinforced sway bar bushing bracket with an integrated tow hook that may serve as a more robust sway bar bushing bracket, as well as providing a strong connection point with a tow hook.

13 Claims, 5 Drawing Sheets

200
210
210
210
208
206
202
204

206
208
210
210
210
210
210
210
200
202
204

100
106
102
104

106
102
100
104

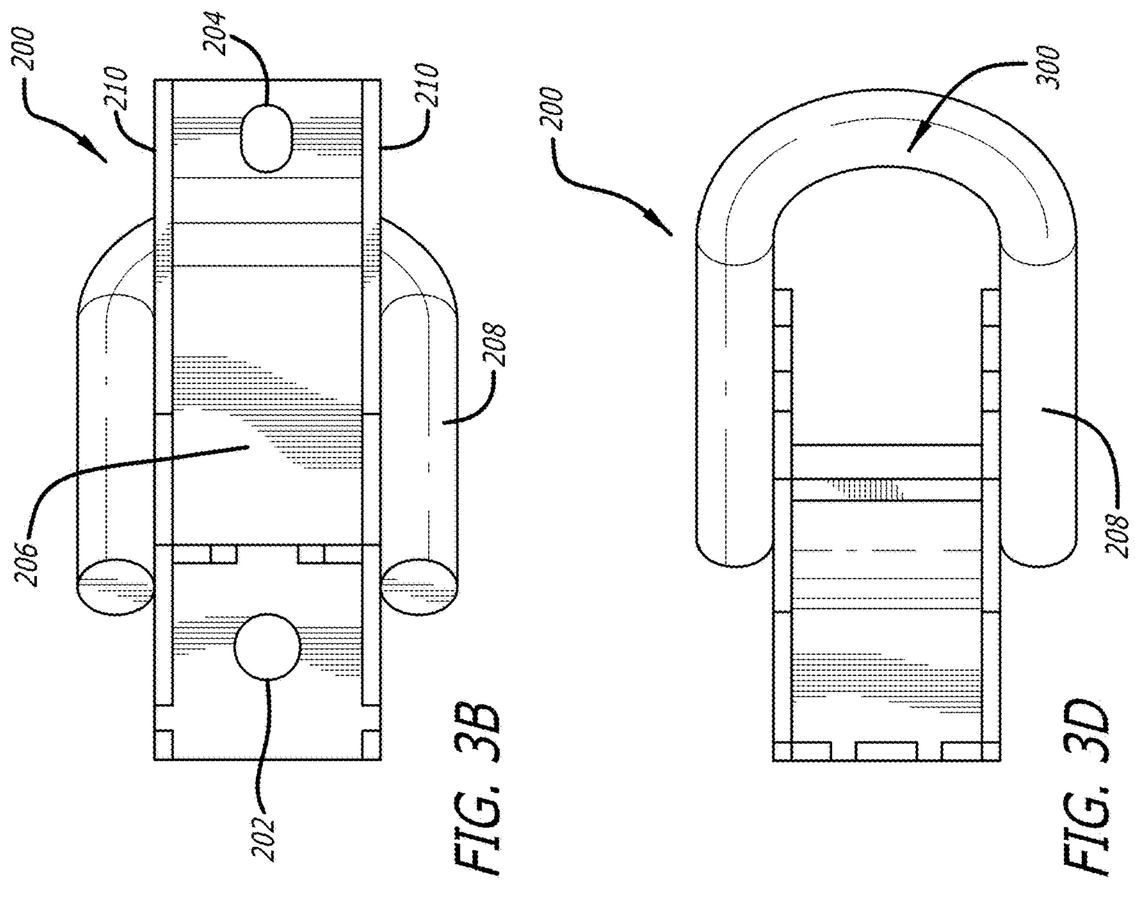
200
204
210
210
208
206
202
FIG. 3B
200
300
208
FIG. 3D
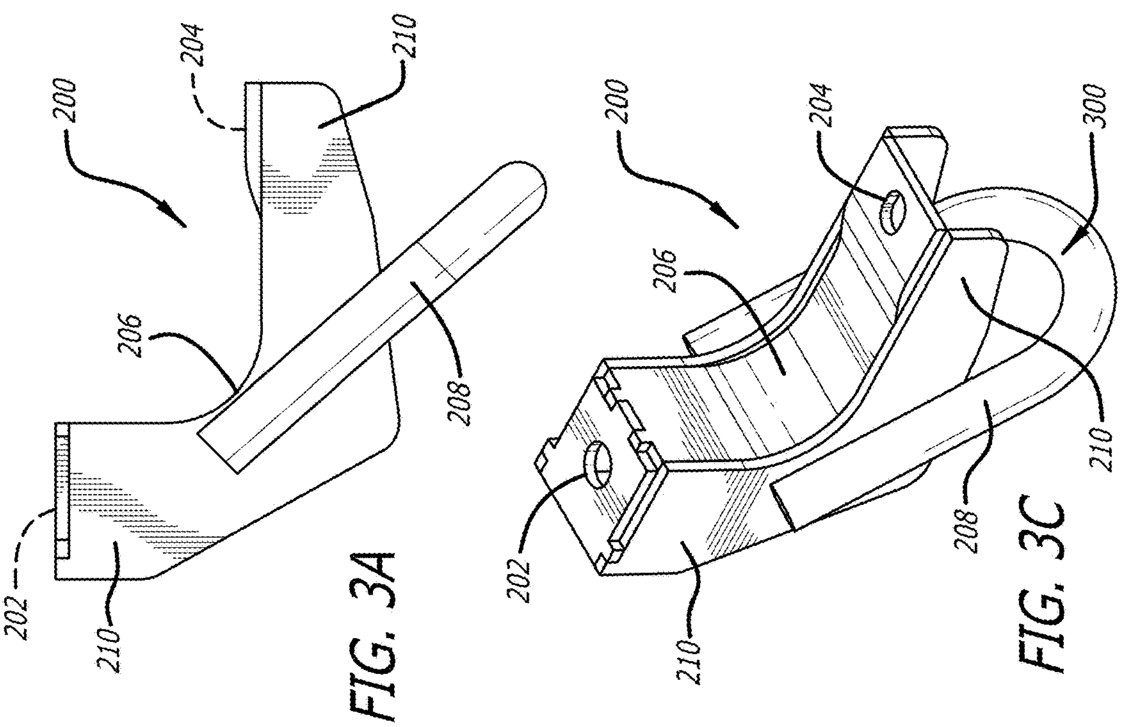
200
204
210
206
208
202
210
FIG. 3A
200
204
300
206
210
208
202
210
FIG. 3C

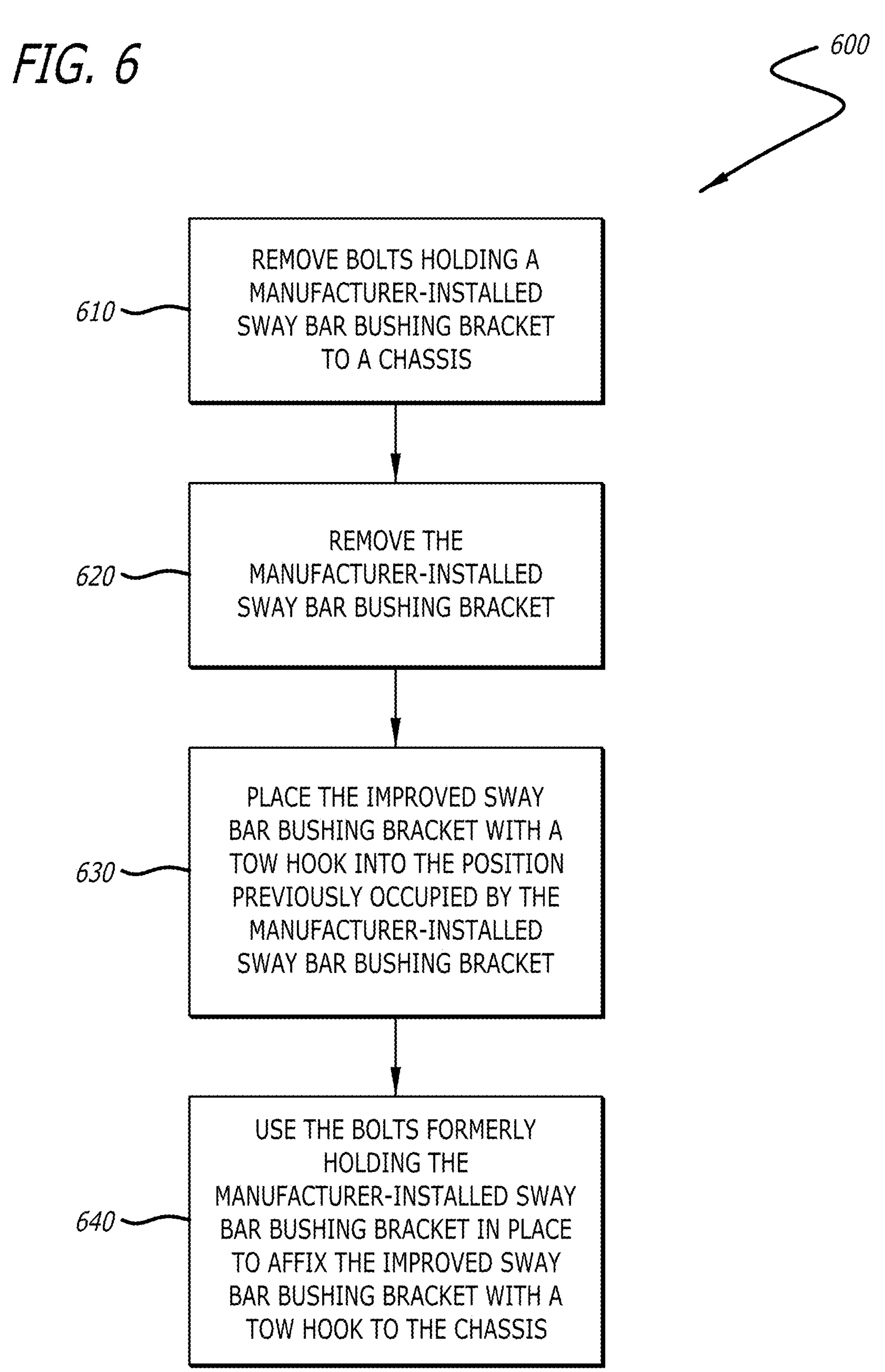
FIG. 6
600
610
REMOVE BOLTS HOLDING A MANUFACTURER-INSTALLED SWAY BAR BUSHING BRACKET TO A CHASSIS
620
REMOVE THE MANUFACTURER-INSTALLED SWAY BAR BUSHING BRACKET
630
PLACE THE IMPROVED SWAY BAR BUSHING BRACKET WITH A TOW HOOK INTO THE POSITION PREVIOUSLY OCCUPIED BY THE MANUFACTURER-INSTALLED SWAY BAR BUSHING BRACKET
640
USE THE BOLTS FORMERLY HOLDING THE MANUFACTURER-INSTALLED SWAY BAR BUSHING BRACKET IN PLACE TO AFFIX THE IMPROVED SWAY BAR BUSHING BRACKET WITH A TOW HOOK TO THE CHASSIS

SWAY BAR BUSHING BRACKET WITH TOW HOOK

This application is a continuation of U.S. Non-Provisional patent application Ser. No. 18/050,960, filed Oct. 28, 2022, which is incorporated by reference herein in its entirety.

FIELD

The present disclosure relates to auto mechanics. More particularly, the present disclosure relates to installing tow hooks on certain pickup trucks and other vehicles that do not come from the manufacturer with mounting points

BACKGROUND

Currently, some work vehicles and/or off-road vehicles come from the manufacturer lacking tow hooks—or even a strong point on the rear bumper assembly and/or the chassis to install a tow hook. A non-limiting example of a vehicle configurable for implementing the tow hook is the Toyota Tundra. It is highly desirable for such a vehicle to have connection points for being towed and/or for recovery from being stuck in a natural hazard like mud or water.

BRIEF DESCRIPTION OF DRAWINGS

The above and other aspects, features, and advantages of several embodiments of the present disclosure will be more apparent from the following description as presented in conjunction with the following several figures of the drawings.

FIG. 3A is a technical drawing of a side view of an improved sway bar bushing bracket in accordance with an embodiment of the invention;

FIG. 3B is a technical drawing of a top view of an improved sway bar bushing bracket in accordance with an embodiment of the invention;

FIG. 3C is a technical drawing of a perspective view of an installed improved sway bar bushing bracket in accordance with an embodiment of the invention;

FIG. 3D is a technical drawing of a bottom view of an installed improved sway bar bushing bracket in accordance with an embodiment of the invention;

FIG. 6 is a flowchart of a process for installing an improved sway bar bushing bracket in accordance with an embodiment of the invention.

Figures 1A, 1B, 2A, 2B:
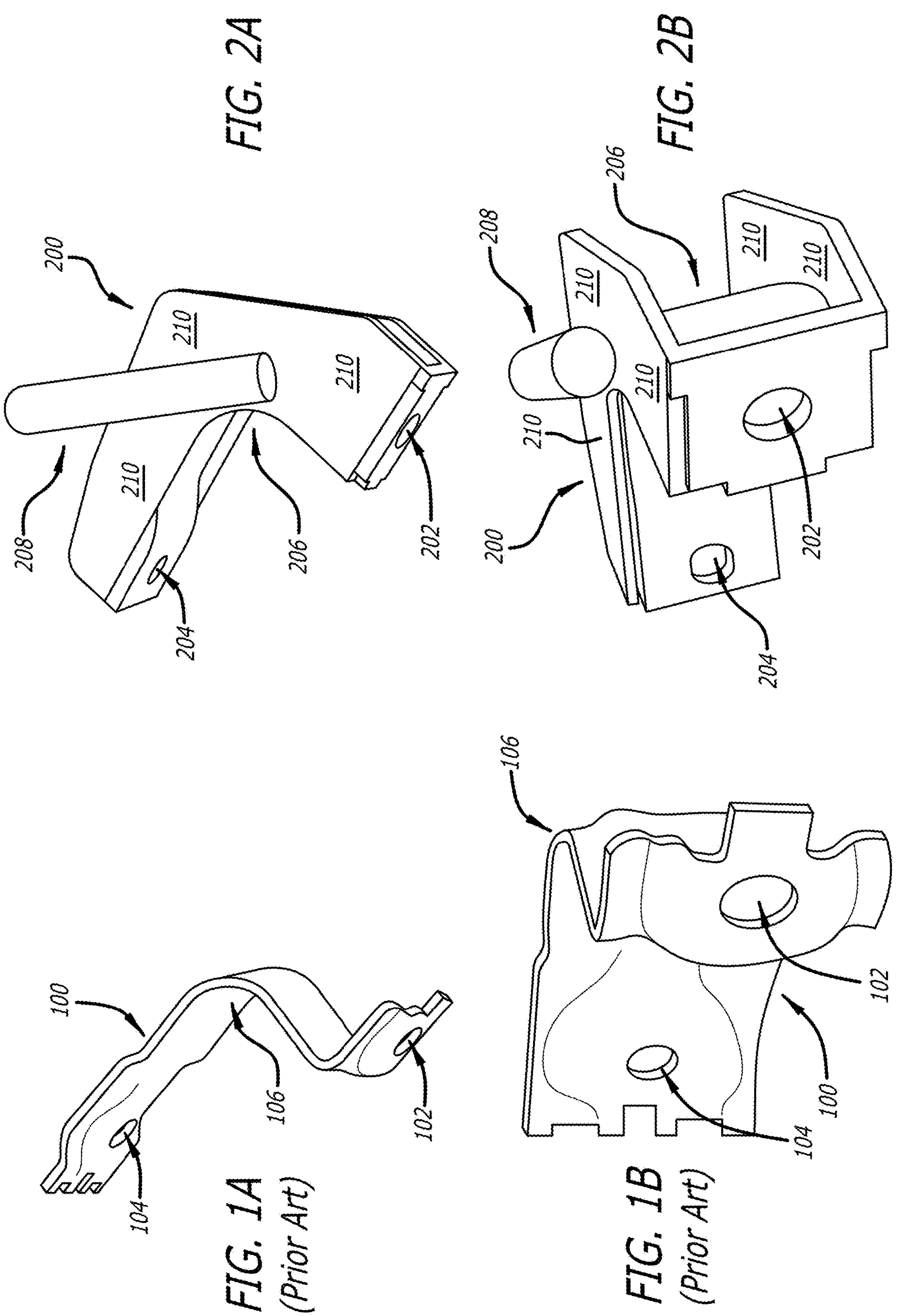
FIG. 1A is a diagram of a prior art sway bar bushing bracket in accordance with an embodiment of the invention.
FIG. 1B is a diagram of a prior art sway bar bushing bracket in accordance with an embodiment of the invention.
FIG. 2A is a diagram of an improved sway bar bushing bracket in accordance with an embodiment of the invention.
FIG. 2B is a diagram of an improved sway bar bushing bracket in accordance with an embodiment of the invention.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements to facilitate understanding of the various presently disclosed embodiments. In addition, common but well-understood elements that are useful or necessary in a commercially feasible embodiment are often not depicted in order to facilitate a less obstructed view of these various embodiments of the present disclosure.

DETAILED DESCRIPTION

In response to the problems described above, a novel and improved sway bar bushing bracket with a tow hook design is disclosed. In general, a sway bar is securely coupled to the chassis or frame to add stability when there is a sudden change (like hitting a pot hole in the road) that would cause the chassis or frame to flex to follow it. The more rebust the sway bar to more resistant the vehicle is to these twisting motions.

In certain vehicles, the manufacturer-installed sway bar bushing bracket may be replaced with a reinforced sway bar bushing bracket with an integrated tow hook that may serve as a more robust sway bar bushing bracket, as well as providing a strong connection point with a tow hook. This allows for safer towing the vehicle out of a hazard and for the vehicle to be more safely towed by another vehicle.

Referring to FIG. 1A, a diagram of a prior art sway bar bushing bracket in accordance with an embodiment of the invention is shown. Present in the figure is a detached sway bar bushing bracket 100 shown from a side angle. Bracket 100 has two bolt holes 102 and 104 for mounting and a curved portion 106 near the middle of bracket 100. When installed, bracket 100 comprises a portion of the entire sway bar assembly.

Referring to FIG. 1B, a diagram of a prior art sway bar bushing bracket in accordance with an embodiment of the invention is shown. In the figure, bracket 100 is shown from the top side (e.g., the side facing upward when installed). Also present in the figure are bolt holes 102 and 104 and curved portion 106.

Figure 1C:
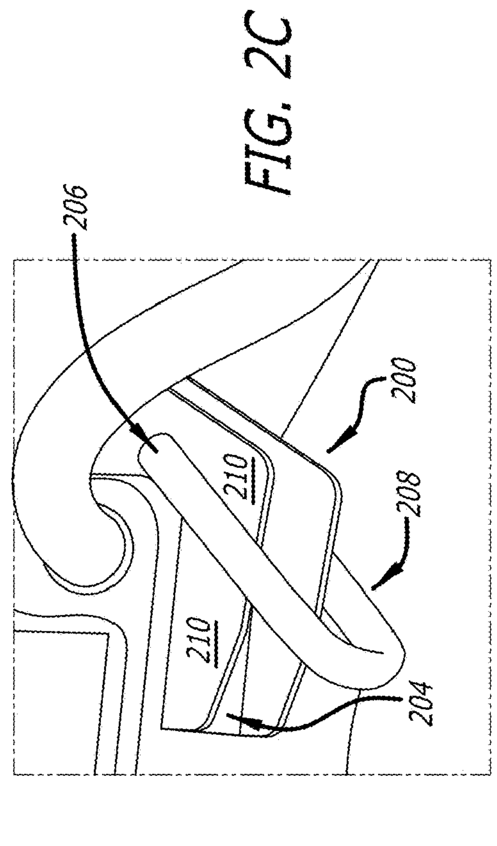
FIG. 1C is a diagram of a prior art sway bar bushing bracket in accordance with an embodiment of the invention.

Referring to FIG. 1C, a diagram of a prior art sway bar bushing bracket in accordance with an embodiment of the invention is shown. Sway bar bushing bracket 100 has two bolt holes 102 (not shown) and 104 for mounting and a curved portion 106 near the middle. Bolt hole 104 is shown with a bolt affixing bracket 100 securely to the chassis. Bracket 100 is shown installed in an exemplary Toyota Tundra. Persons of ordinary skill in the art will realize that many embodiments the invention embodying the inventive principles disclosed herein may be manufactured to fit many other vehicles.

Figure 1D:
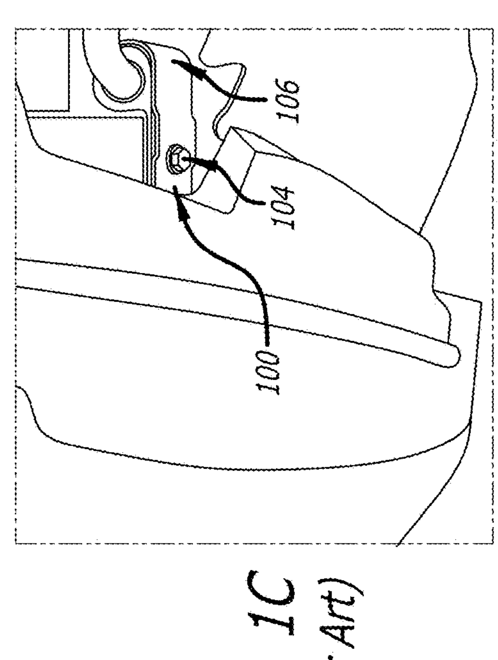
FIG. 1D is a diagram of a prior art sway bar bushing bracket in accordance with an embodiment of the invention.

Referring to FIG. 1D, a diagram of a prior art sway bar bushing bracket in accordance with an embodiment of the invention is shown. Bracket 100 is shown prior to being removed in more detail than in FIG. 1C.

Referring to FIG. 2A, a diagram of an improved sway bar bushing bracket in accordance with an embodiment of the invention is shown. Present in the figure is a detached improved sway bar bushing bracket 200 shown from a side angle. Sway bar bushing bracket 200 has two bolt holes 202 and 204 for mounting and a curved portion 206 near the middle. Also present in the figure is tow hook 208 coupled to reinforced siding 210.

When installed, bracket 200 comprises a portion of the entire sway bar assembly in a similar manner to prior art bracket 100 in FIG. 1A to FIG. 1D discussed above. The reinforced siding 210 provides a robust connection for tow hook 208 as well as providing extra support for the sway bar bushing bracket function.

In some embodiments, the improved sway bar bushing bracket 200 may be made from a steel plate design weldment. In alternate embodiments, bracket 200 could be made from a solid billet or forging of metal. In other embodiments, the tow hook 208 may be replaced with a hole or other opening to accommodate a recovery shackle. Although not visible in the figure, the bracket 200 is powder-coated red so it is easily recognized in the elements if needed during off-road incidents.

Referring to FIG. 2B, a diagram of an improved sway bar bushing bracket in accordance with an embodiment of the invention is shown. In the figure, bracket 200 is shown from the top side (e.g., the side facing upward when installed). Sway bar bushing bracket 200 has two bolt holes 202 and 204 for mounting and a curved portion 206 near the middle. Also present in the figure is tow hook 208 coupled to reinforced siding 210.

When installed, bracket 200 is securely coupled to the frame or chassis and comprises a portion of the entire sway bar assembly in a similar manner to bracket 100 in FIG. 1A to FIG. 1D discussed above. The reinforced siding 210 on both sides provides a robust connection for tow hook 208 as well as providing improved support for the sway bar bushing bracket function.

In some embodiments, the improved sway bar bushing bracket 200 may be made from a steel plate design weldment. In alternate embodiments, bracket 200 could be made from a solid billet or forging of metal. In other embodiments, the tow hook 208 may be replaced with a hole or other opening to accommodate a recovery shackle. Although not visible in the figure, the bracket 200 is powder-coated red so it is easily recognized in the elements if needed during off-road incidents.

Figure 2C:
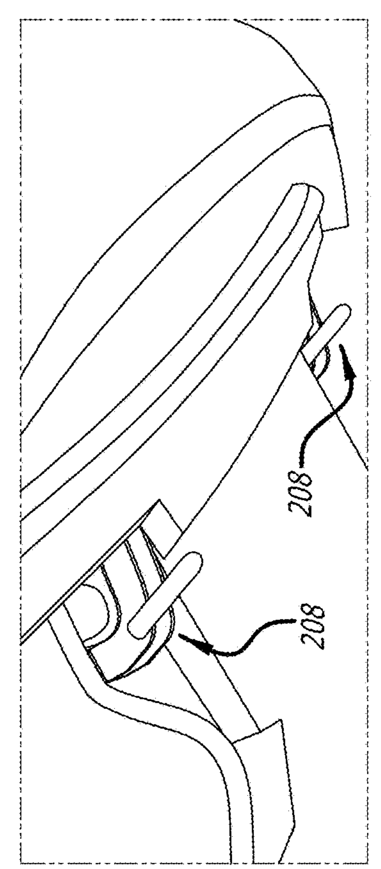
FIG. 2C is an installed improved sway bar bushing bracket in accordance with an embodiment of the invention.

Referring to FIG. 2C, a diagram of an installed improved sway bar bushing bracket in accordance with an embodiment of the invention is shown. Sway bar bushing bracket 200 has two bolt holes 202 and 204 (not shown) for secure mounting and a curved portion 206 near the middle. Also present in the figure is tow hook 208 mounted on reinforced siding 210.

When installed, bracket 200 comprises a portion of the entire sway bar assembly in a similar manner to bracket 100 in FIG. 1A to FIG. 1D discussed above. The reinforced siding 210 provides a robust connection for tow hook 208 as well as providing extra support for the sway bar bushing bracket function.

In some embodiments, the improved sway bar bushing bracket 200 may be made from a steel plate design weldment. In alternate embodiments, bracket 200 could be made from a solid billet or forging of metal. In other embodiments, the tow hook 208 may be replaced with a hole or other opening to accommodate a recovery shackle. Although not visible in the figure, the bracket 200 is powder-coated red so it is easily recognized in the elements if needed during off-road incidents.

Figure 2D:
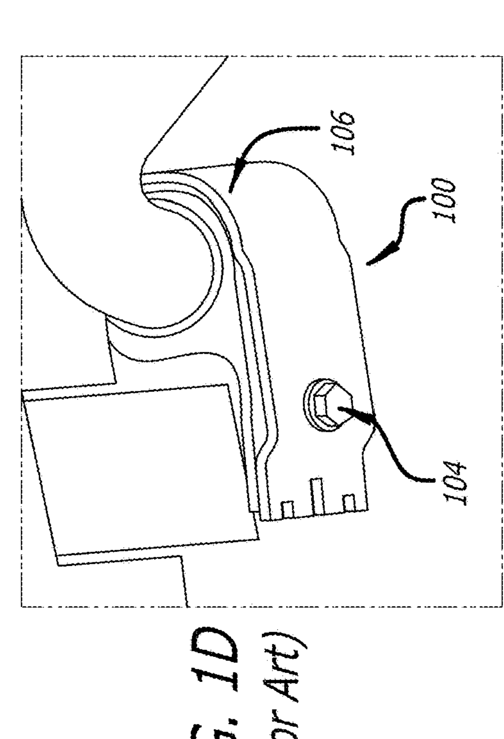
FIG. 2D is a diagram of two installed improved sway bar bushing brackets in accordance with an embodiment of the invention.

Referring to FIG. 2D, a diagram of two installed improved sway bar bushing brackets in accordance with an embodiment of the invention is shown. Present in the figure are two tow hooks 208, one on each side of the front of an exemplary Toyota Tundra after installation.

Referring to FIG. 3A, a technical drawing of a side view of an improved sway bar bushing bracket in accordance with an embodiment of the invention is shown. Shown in the figure are improved sway bar bushing bracket 200, the locations of bolt holes 202 and 204, curved portion 206, tow hook 208, and reinforced siding 210. All these features function as described in conjunction with FIG. 2A through FIG. 2D.

Referring to FIG. 3B, a technical drawing of a top view of an improved sway bar bushing bracket in accordance with an embodiment of the invention is shown. Shown in the figure are improved sway bar bushing bracket 200, bolt holes 202 and 204, curved portion 206, tow hook 208, and reinforced siding 210. All these features function as described in conjunction with FIG. 2A through FIG. 2D.

Referring to FIG. 3C, a technical drawing of a perspective view of an improved sway bar bushing bracket in accordance with an embodiment of the invention is shown. Shown in the figure are improved sway bar bushing bracket 200, bolt holes 202 and 204, curved portion 206, tow hook 208, and reinforced siding 210. All these features function as described in conjunction with FIG. 2A through FIG. 2D. Attention is drawn to the semicircular shape 300 of tow hook 208.

Referring to FIG. 3D, a technical drawing of a bottom view of an improved sway bar bushing bracket in accordance with an embodiment of the invention is shown. Shown in the figure is improved sway bar bushing bracket 200 and tow hook 208. These features function as described in conjunction with FIG. 2A through FIG. 2D. Attention is drawn to the semicircular shape 300 of tow hook 208.

Figure 4:
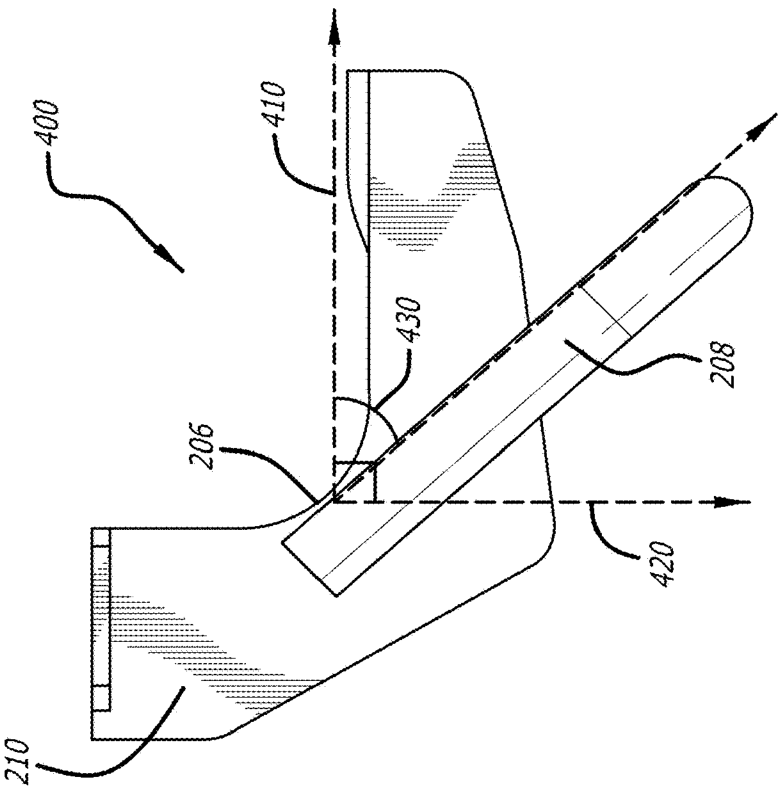
FIG. 4 is a technical drawing of a side view of an improved sway bar bushing bracket in accordance with an embodiment of the invention.

Referring to FIG. 4, a technical drawing of a side view of an improved sway bar bushing bracket in accordance with an embodiment of the invention is shown. Improved sway bar bushing bracket 200 is shown with markings 400 superimposed on top of the technical drawing of FIG. 3A. Markings 400 comprise a horizontal axis 410 and a vertical axis 420 with the origin point where tow hook 208 is tangentially disposed to curved portion 206.

Axes 410 and 420 are disposed at a 90-degree angle relative to each other, as indicated by the square abutting the origin point. Arc 430 indicates that the angle of tow hook 208 tangential to curved portion 206 is 49 degrees in the figure. While 49 degrees is optimal in some embodiments for some vehicles, persons skilled in the art will readily realize that other angles of tow hook 208 may be used to accommodate different makes and models of vehicles without departing from the inventive principles disclosed herein. Also, allowances must be made for different attachment geometries for tow bars and recovery shackles as well as manufacturing tolerances.

In some embodiments, a range of 34 degrees to 64 degrees for the tow hook angle may be optimal. In other embodiments, a range of 39 degrees to 59 degrees for the tow hook angle may be optimal. In yet other embodiments, a range of 44 degrees to 54 degrees for the tow hook angle may be optimal. In alternate embodiments, a range of 48 degrees to 50 degrees for the tow hook angle may be optimal.

Figure 5:
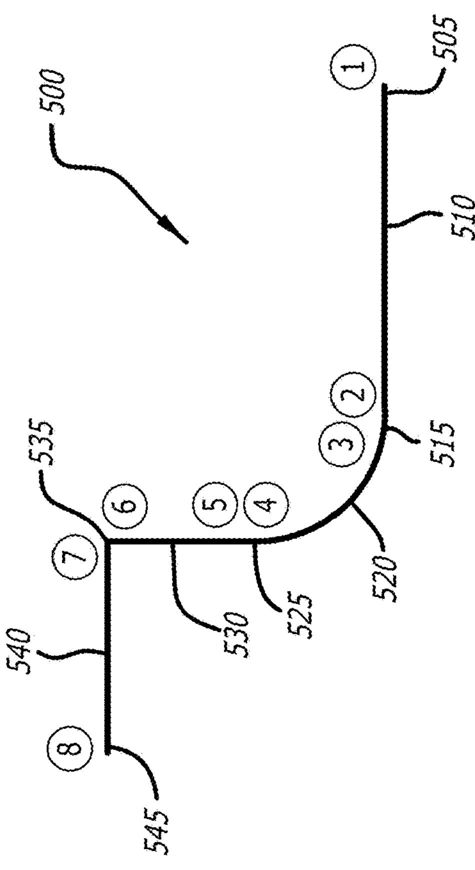
FIG. 5 is an abstract drawing of a side view of an improved sway bar bushing bracket in accordance with an embodiment of the invention.

Referring to FIG. 5, an abstract drawing of a side view of an improved sway bar bushing bracket in accordance with an embodiment of the invention is shown. Abstract drawing 500 may comprise a first flat portion 510 coupled to a rounded 90-degree bend portion 520, which may be coupled to a second flat portion 530, which may be coupled to a third flat portion 540. First flat portion 510 may have a first end at 505 and a second end at 515. Rounded 90-degree bend portion 520 may have a third end at 515 and a fourth end at 525. Second flat portion 530 may have a first end at 525 and a second end at 535. Third flat portion 540 may have a first end at 535 and a second end at 545.

The first flat portion 510 may be coupled to the rounded 90-degree bend portion 520 at point 515, the rounded 90-degree bend portion 520 may be coupled to second flat portion 530 at point 525, and the second flat portion 530 may be coupled to third flat portion 540 at point 535. A first bolt hole (not shown) may be placed in first flat portion 510. A second bolt hole (not shown) may be placed in third flat portion 540. The optimal position of the bolt holes will be determined by the attachment points on the chassis of the vehicle to which the improved sway bar bracket 200 is to be placed and may vary from embodiment to embodiment.

FIG. 6 is a flowchart of a process 600 for installing a sway bar bushing bracket in accordance with an embodiment of the invention. Process 600 may begin with removing the bolts holding a manufacturer-installed sway bar bushing bracket in place (block 610), and then removing the bracket itself (block 620).

The improved sway bar bushing bracket with a tow hook may be placed into the position previously occupied by the manufacturer-installed sway bar bushing bracket (block 630), and then the bolts formerly holding the manufacturer-installed sway bar bushing bracket in place may be used to affix the improved sway bar bushing bracket with a tow hook to the chassis (block 640). In certain embodiments, replacement bolts may be used.

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public, regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A sway bar bushing bracket, comprising:

a first flat portion having a first end and a second end;

a rounded bend portion having a third end and a fourth end;

a second flat portion having a fifth end and a sixth end;

a third flat portion having a seventh end and an eighth end, wherein:

the second end is coupled to the third end, the fourth end is coupled to the fifth end, the sixth end is coupled to the seventh end forming a bend where the third flat portion is parallel to the first flat portion, with the eighth end disposed away from the first end, a first bolt hole is disposed in the first flat portion, and a second bolt hole is disposed in the third flat portion;

a first reinforced siding and a second reinforced siding, each having an inside area and an outside area, wherein the inside areas are coupled to opposite sides at least a portion of the first flat portion, the bend portion, the second flat portion, or the third flat portion; and a vehicle recovery interface coupled to the bracket and configured to accommodate a recovery shackle.

2. The sway bar bushing bracket of claim 1, wherein, the tow hook is coupled to the first and second reinforced sidings tangentially adjacent to the gently rounded 90-degree bend portion.

3. The sway bar bushing bracket of claim 2, wherein, the tow hook is mounted towards the first flat portion of the bracket at an angle of between 34 degrees and 64 degrees.

4. The sway bar bushing bracket of claim 2, wherein, the tow hook is mounted towards the first flat portion of the bracket at an angle of between 39 degrees and 59 degrees.

5. The sway bar bushing bracket of claim 2, wherein, the tow hook is mounted towards the first flat portion of the bracket at an angle of between 44 degrees and 54 degrees.

6. The sway bar bushing bracket of claim 2, wherein, the tow hook is mounted towards the first flat portion of the bracket at an angle of between 48 degrees and 50 degrees.

7. The sway bar bushing bracket of claim 1, wherein the tow hook has a semicircular rounded portion.

8. The sway bar bushing bracket of claim 1, wherein the bracket is made from a steel plate design weldment.

9. The sway bar bushing bracket of claim 1, wherein the bracket is made from a solid billet or forging of metal.

10. A sway bar bushing bracket, comprising:

a first flat portion having a first end and a second end;

a rounded bend portion having a third end and a fourth end;

a second flat portion having a fifth end and a sixth end;

a third flat portion having a seventh end and an eighth end, wherein:

the second end is coupled to the third end, the fourth end is coupled to the fifth end, the sixth end is coupled to the seventh end where the third flat portion is parallel to the first flat portion with the eighth end disposed away from the first end, a first bolt hole is disposed in the first flat portion, and a second bolt hole is disposed in the third flat portion;

a first reinforced siding and a second reinforced siding; and a vehicle recovery interface coupled to the bracket and configured to accommodate a recovery shackle.

11. The sway bar bushing bracket of claim 10, wherein the opening is configured to accommodate a recovery shackle.

12. The sway bar bushing bracket of claim 11, wherein the bracket is made from a steel plate design weldment.

13. The sway bar bushing bracket of claim 11, wherein the bracket is made from a solid billet or forging of metal.

* * * * *